United States Patent [19]

Schippers et al.

[11] 4,209,207
[45] Jun. 24, 1980

[54] THRUST BEARING ASSEMBLY

[75] Inventors: Heinz Schippers; Werner Branscheid; Erich Lenk; Udo Hardt, all of Remscheid, Fed. Rep. of Germany

[73] Assignee: Barmag Barmer Maschinenfabrik Aktiengesellschaft, Remscheid, Fed. Rep. of Germany

[21] Appl. No.: 54,413

[22] Filed: Jul. 3, 1979

[30] Foreign Application Priority Data

Jul. 3, 1978 [DE] Fed. Rep. of Germany ... 7819938[U]

[51] Int. Cl.² ............................................. F16C 17/08
[52] U.S. Cl. ........................................ 308/9; 308/170
[58] Field of Search .................... 308/9, 170, 135, 160, 308/169, 172, DIG. 1

[56] References Cited

U.S. PATENT DOCUMENTS

| 2,349,131 | 5/1944 | Anderson | 308/170 |
| 3,891,282 | 6/1975 | Tuffias | 308/170 |
| 4,035,041 | 7/1977 | Larsson | 308/135 |
| 4,126,360 | 11/1978 | Miller et al. | 308/9 |

Primary Examiner—Lenard A. Footland
Attorney, Agent, or Firm—Bell, Seltzer, Park & Gibson

[57] ABSTRACT

A thrust bearing assembly for use in an exhaust gas turbocharger or the like, and which includes a holding plate fixed to the turbocharger housing, a shaft rotatably mounted in the housing and extending through an opening in the plate, and a pair of flat, annular rings mounted on the shaft and receiving the plate therebetween to define a pair of opposing bearing surfaces on each side of the plate. A lubrication system supplies pressurized lubricant to the opposing bearing surfaces, and at least one of each pair of opposing bearing surfaces includes a plurality of generally radially directed channels, whereby a hydrodynamic load bearing pressure is developed in the lubricant between the bearing surfaces during relative rotation thereof, to thereby minimize frictional resistance and wear.

13 Claims, 4 Drawing Figures

THRUST BEARING ASSEMBLY

Exhaust gas turbochargers for internal combustion engines typically consist of an exhaust gas turbine which drives a rotary compressor, and which serves to utilize the exhaust gas energy of the engine in order to charge the engine with air at an elevated pressure. This in turn increases the performance of the engine. Exhaust gas turbochargers can be used in both Diesel engines and in Otto cycle engines.

The rotational speeds of such exhaust gas turbochargers often are above 100,000 revolutions per minute. For this reason, hydrostatic or hydrodynamic bearings are preferably used for the rotary and/or axial mounting of the shaft mounting the turbine wheel and compressor wheel.

It is an object of the present invention to provide an oil lubricated axial or thrust bearing assembly which is adapted for use in such exhaust gas turbochargers, and which minimizes frictional resistance and thus the consumption of energy.

It is a more specific object of the present invention to provide a thrust bearing assembly wherein a hydrodynamic load bearing pressure is developed in the lubricant between the bearing surfaces during relative rotation thereof, to thereby minimize frictional resistance and wear.

These and other objects and advantages of the present invention are achieved in the embodiments illustrated herein by the provision of a thrust bearing assembly which comprises a housing, a shaft, rotary bearing means rotatably mounting the shaft in the housing, a holding plate fixed to the housing and including a circular opening concentrically receiving the shaft, and a pair of flat, annular rings mounted on the shaft in an axially spaced apart and axially fixed relationship and receiving the plate therebetween to define a pair of opposing bearing surfaces on each side of the plate. The plate includes a duct which communicates with the annular gap formed between the circular opening and the shaft, for conveying pressurized lubricant from the engine lubrication system to the gap and so that the lubricant flows across each pair of bearing surfaces. A plurality of generally radially directed channels are positioned in at least one of each pair of opposing bearing surfaces, whereby a hydrodynamic load bearing pressure is developed in the lubricant between the bearing surfaces during relative rotation thereof.

In one embodiment of the invention, the rings are fixed directly to the shaft for rotation therewith, and there is further provided a spacer sleeve mounted coaxially about the shaft and extending between the rings. The sleeve has a length slightly greater than the width of the holding plate, so as to define a predetermined clearance between the opposing bearing surfaces.

In another embodiment, a spacer sleeve is mounted coaxially about the shaft, and the pair of rings are mounted upon the sleeve so as to permit relative rotation therebetween. Also, there is provided a second pair of outer rings fixedly mounted directly to the shaft for rotation therewith, the outer rings being positioned immediately adjacent the first mentioned pair of rings to define a second pair of opposing bearing surfaces. Preferably, at least one of each of the second pair of opposing bearing surfaces includes a plurality of generally radially directed channels as described above.

Some of the objects having been stated, other objects will appear as the description proceeds, when taken in connection with the accompanying drawings in which FIG. 1 is a schematic sectional view of an exhaust gas turbocharger which includes a thrust bearing assembly embodying the present invention;

FIG. 2 is a side elevational view of the inside surface of one of the annular rings employed in the embodiment of FIG. 1a; and FIG. 3 is a side elevational view of the inside surface of the other annular ring employed in the embodiment of FIG. 1a.

Figure 1:
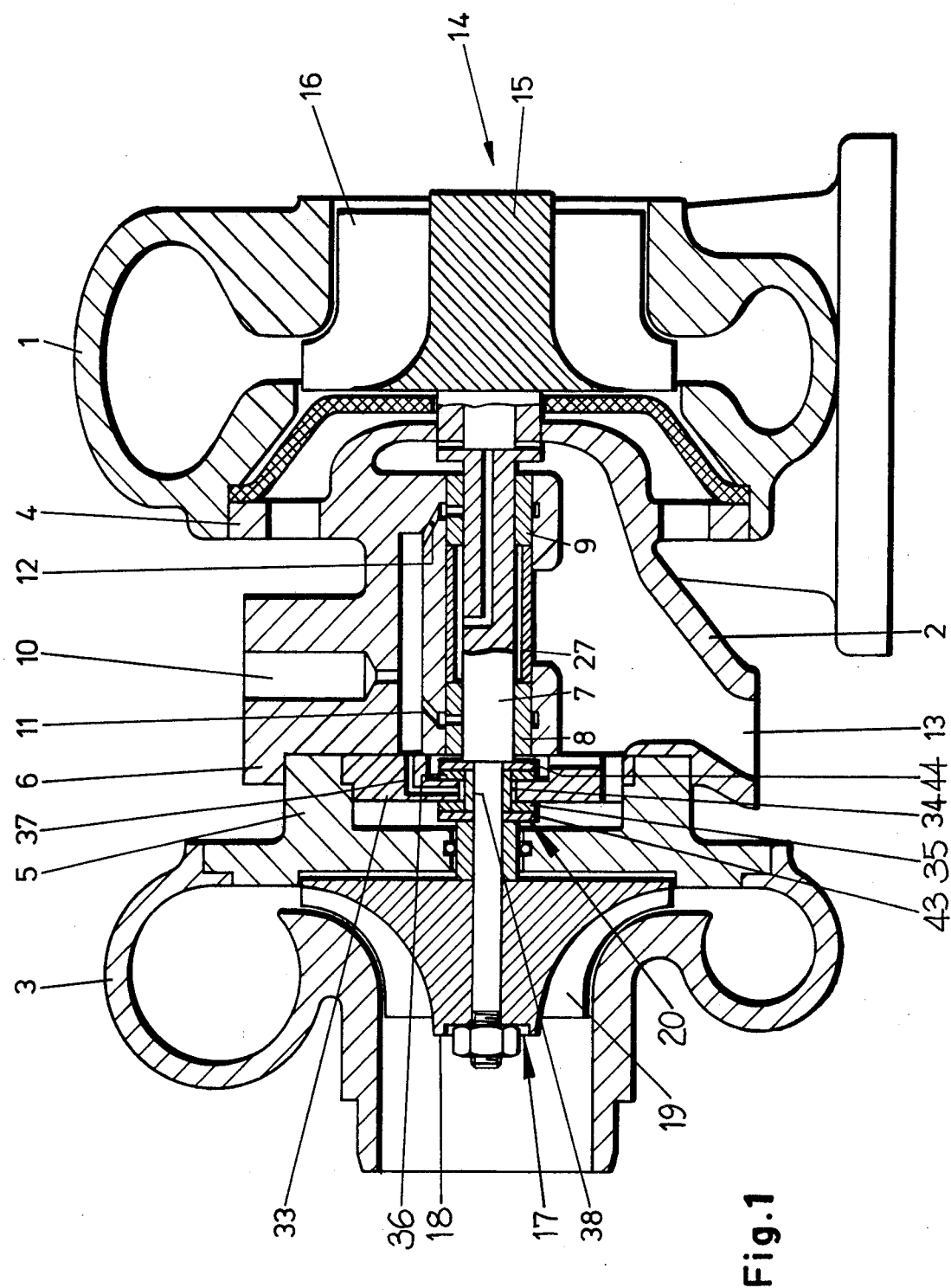
FIG. 1a is a fragmentary sectional view illustrating a second embodiment of a thrust bearing assembly adapted for use in an exhaust gas turbocharger of the type shown in FIG. 1.

An exhaust gas turbocharger which embodies the present invention is illustrated in FIG. 1, and comprises a housing which is composed of a turbine portion 1, a bearing portion 2, and a compressor portion 3. All of these housing portions are centered relative to each other, and more particularly, the turbine portion 1 is centered relative to the bearing portion 2 by the flange 4, and the compressor portion 3 is centered relative to the bearing portion 2 by the projection 5 which is fitted in the recess 6 of the bearing portion 2. The shaft 7 is rotatably mounted in the housing by means of oil lubricated sleeve bearings 8 and 9, and an oil lubricated axial or thrust bearing 20 is provided for securing the shaft 7 against axial movement with respect to the housing.

The oil lubricated bearings 8 and 9 are supplied with pressurized oil from the engine lubrication system through passages 10, 11 and 12. The pressurized oil issues from both sides of the bearings 8 and 9 on the shaft, and then flows outwardly through the opening 13 and into an oil sump (not shown) of the engine. An exhaust gas turbine wheel 14, comprising a hub 15 and turbine blades 16, is mounted on one end of the shaft 7. A centrifugal or rotary compressor wheel 17 is mounted at the other end of the shaft 7 and consists of the hub 18 and blades 19. Further structural details of the illustrated exhaust gas turbocharger are described in applicants' co-pending application Ser. No. 06/054411, filed July 3, 1979, and entitled EXHAUST GAS TURBOCHARGER.

Figure 1A:
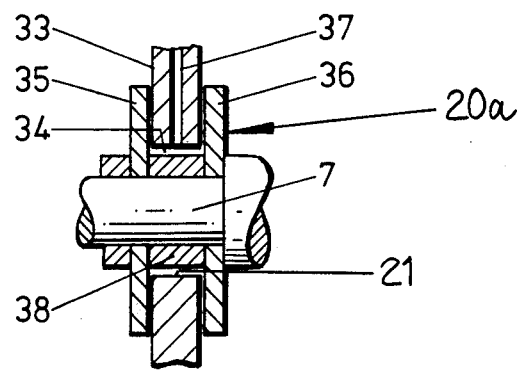

In the embodiment illustrated in FIG. 1a, the thrust bearing assembly 20a consists of a holding plate 33 which is rigidly connected to the housing, and thus insures the axial fixing of the shaft 7 in the manner to become apparent. The plate 33 includes a circular opening 21 concentrically receiving the shaft 7 and forming a concentric annular gap 34 therebetween. A pair of flat, annular rings 35, 36 are mounted on the shaft in an axially spaced apart and axially fixed relationship, and with the rings receiving the plate 33 therebetween to define a pair of opposing bearing surfaces on each side of the plate. As illustrated, the rings 35, 36 have an external diameter at least about twice the diameter of the circular opening 21, to thereby provide a relatively large bearing surface area.

In the embodiment of FIG. 1a the rings 35, 36 are preferably fixed directly to the shaft 7 for rotation therewith, and there is further provided a spacer sleeve 38 mounted coaxially about the shaft and extending between the rings 35, 36. The sleeve 38 has an outer diameter somewhat less than the diameter of the opening 21, and so that only a portion of the annular gap 34 is occupied by the sleeve 38. Also, the sleeve 38 has a length slightly greater than the width of the plate so as to define a predetermined clearance between the opposing bearing surfaces.

A duct 37 extends through the plate and communicates with the portion of the annular gap 34 formed between the circular opening 21 of the plate and the sleeve 38. The other end of the duct communicates with the passage 10, whereby the pressurized lubricant may be conveyed to the annular gap and then across each pair of bearing surfaces.

Figure 2:
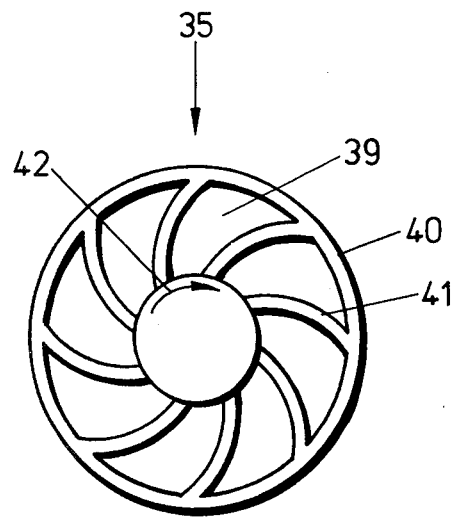
Figure 3:
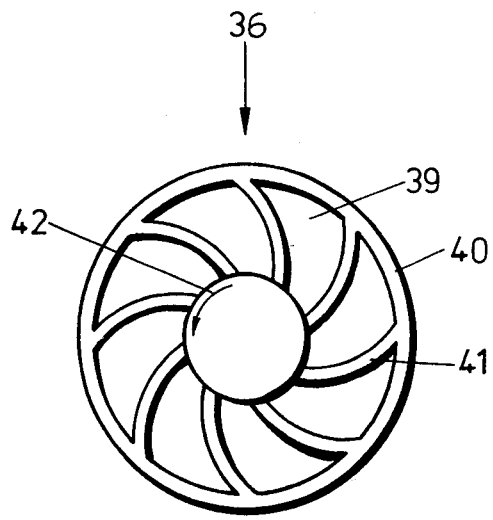

As best seen in FIGS. 2 and 3, a plurality of generally radially directed channels 39 are positioned on the inwardly facing bearing surface of each of the rings 35, 36. The channels are arcuately curved in a direction corresponding to the rotational direction 42 in which the channeled bearing surface is intended to rotate with respect to the opposing bearing surface of the plate 33. More particularly, the channels are defined by flat, co-planar, relatively narrow radial shoulders 41, and a circumferentially continuous flat shoulder 40 at the radial extremity of each ring, and with the circumferential shoulder 40 being co-planar with the radial shoulders 41. Further, the channels 39 are uniformly sized and spaced about the circumference of the associated bearing surface, and they cover the major portion of the area thereof. The channels have a flat base wall which is parallel to the plane defined by the shoulders 40 and 41, and the channels have a depth on the order of about one millimeter. The radial shoulders 41 are preferably curved along less than 90 degrees of an arc of a circle, and typically they are curved along about a 60 degree arc substantially as illustrated in FIGS. 2 and 3. The bearing surfaces on the plate 33 which contact the channeled surfaces of the rings 35, 36 are preferably flat and uninterrupted.

From the above description, it will be noted that upon relative rotation of the rings 35 and 36 in the direction of the arrow 42, the lubricating oil, which enters the gap 34 through the duct 37, will tend to flow radially outwardly between the bearing surfaces by reason of the fact that the oil is under pressure from the engine lubrication system. However, the fact that the shoulders 41 are curved forwardly in the direction of rotation, results in the oil being forced radially inwardly. This results in a hydrodynamic load bearing pressure in the lubricant between the bearing surfaces, which serves to maintain the separation of the surfaces and thereby minimizes frictional resistance and wear.

The formation of a hydrodynamic load bearing pressure could also be achieved by positioning the grooves in the bearing surfaces of the holding plate 33, rather than in the rings 35, 36. However, it is generally preferred to form the grooves in the rings for ease of production. In either event, the channels preferably would be curved in the direction of relative rotation, to thereby contribute to the load bearing pressure as described above.

In the embodiment of FIG. 1, the flat annular rings 35, 36 are mounted upon the spacer sleeve 38 and so as to be rotatable with respect thereto. Also, a second pair of flat, annular outer rings 43, 44 are fixedly mounted directly to the shaft 7 for rotation with the shaft. The outer rings are positioned immediately adjacent the outside surfaces of respective ones of the rings 35, 36, to define a second pair of opposing bearing surfaces. The spacer sleeve 38 extends between and directly contacts the second pair of rings 43, 44 and the sleeve has a predetermined length so as to define the clearance between the pairs of opposing bearing surfaces.

As will be apparent from FIG. 1, the pressurized oil conveyed into the annular gap 34 flows through the bearing surfaces formed between the holding plate 33 and the rings 35, 36, as well as through the bearing surfaces between the rings 35, 36 and the outer rings 43, 44. By this arrangement, a free floating mounting is provided for the inner rings 35, 36 and the relative rotational speed between the bearing surfaces is reduced as compared to the embodiment of FIG. 1a. Channels 39 as described above, are preferably provided not only in the bearing surfaces formed between the plate 33 and rings 35, 36 but also in one of the bearing surfaces formed between the ring 35 and ring 43, as well as the ring 36 and ring 44. The channels in the outer pair of bearing surfaces are also preferably arcuately curved in the manner illustrated in FIGS. 2 and 3, and in a direction corresponding to the intended rotational direction in which the channeled bearing surface moves with respect to the opposing bearing surface.

In the drawings and specification, there has been set forth a preferred embodiment of the invention, and although specific terms are employed, they are used in a generic and descriptive sense only and not for purposes of limitation.

That which is claimed is:

1. A thrust bearing assembly adapted for use in an exhaust gas turbocharger or the like and characterized by minimal frictional resistance, and comprising a housing; a shaft; a holding plate fixed to said housing and including a circular opening concentrically receiving said shaft and forming a concentric annular gap therebetween; a pair of flat, annular rings mounted on said shaft in an axially spaced apart and axially fixed relationship and receiving said plate therebetween to define a pair of opposing bearing surfaces on each side of said plate; duct means communicating with said annular gap for conveying pressurized lubricant thereto and so that the lubricant flows across each pair of bearing surfaces; and channel means positioned in at least one of each pair of opposing bearing surfaces for developing a hydrodynamic load bearing pressure in the lubricant between the bearing surfaces during relative rotation thereof, to thereby minimize frictional resistance and wear.

2. The bearing assembly as defined in claim 1 wherein said channel means comprises a plurality of generally radially directed channels which are arcuately curved in a direction corresponding to the intended rotational direction in which the channeled bearing surface moves with respect to the opposing bearing surface, and whereby the lubricant in the channels is directed radially inwardly during relative rotation.

3. The bearing assembly as defined in claim 2 wherein said channels are uniformly sized and spaced about the circumference of the associated bearing surface, and cover the major portion of the area thereof.

4. The bearing assembly as defined in claim 3 wherein said channels are separated by flat, co-planar, relatively narrow radial shoulders, with said shoulders being curved along between about 60 degrees to 90 degrees of an arc of a circle.

5. The apparatus as defined in claim 4 wherein each of said channeled bearing surfaces includes a circumferentially continuous flat shoulder at the radial extremity thereof, and with said circumferential shoulder being co-planar with said radial shoulders.

6. The bearing assembly as defined in claim 5 wherein said channels have a flat base wall and a depth on the order of about one millimeter.

7. The bearing assembly as defined in claim 1 wherein the external diameter of each of said rings is at least about twice the diameter of said circular opening in said plate, to thereby provide a relatively large bearing surface area.

8. The bearing assembly as defined in claim 1 wherein said channel means comprises a plurality of generally radially directed channels positioned in one only of each pair of said opposing bearing surfaces, and with the other surface of each pair being flat and uninterrupted.

9. The bearing assembly as defined in claim 1 wherein said rings are fixed directly to said shaft for rotation therewith, and further comprising a spacer sleeve mounted coaxially about said shaft and extending between said pair of rings, said sleeve having an outer diameter somewhat less than the diameter of said circular opening in said plate, and having a length slightly greater than the width of said plate and so as to define a predetermined clearance between said opposing bearing surfaces.

10. The bearing assembly as defined in claim 1 further comprising a spacer sleeve mounted coaxially about said shaft, said sleeve having an outer diameter somewhat less than the diameter of said circular opening in said plate, and with said pair of rings being mounted upon said sleeve and so as to be rotatable with respect thereto, and a pair of flat, annular, outer rings fixedly mounted directly to said shaft for rotation with said shaft, said outer rings being positioned immediately adjacent the outside surfaces of respective ones of said first mentioned pair of rings to define a second pair of opposing bearing surfaces.

11. The bearing assembly as defined in claim 10 further comprising channel means positioned in at least one of each of said second pair of opposing bearing surfaces for developing a hydrodynamic load bearing pressure in the lubricant between each of the second pair of opposing bearing surfaces during relative rotation thereof.

12. The bearing assembly as defined in claim 11 wherein said channel means associated with the first mentioned pair of opposing bearing surfaces, and said channel means associated with said second pair of opposing bearing surfaces, each comprise a plurality of generally radially directed channels positioned in one only of each such pair of bearing surfaces, and with said channels being arcuately curved in a direction corresponding to the intended rotational direction in which the channeled bearing surface moves with respect to the opposing bearing surface.

13. The bearing assembly as defined in claim 12 wherein said spacer sleeve extends between and directly contacts said second pair of rings, said sleeve having a predetermined length so as to define the clearance between said pairs of opposing bearing surfaces.

* * * * *